United States Patent [19]

Buttry et al.

[11] Patent Number: 4,780,259

[45] Date of Patent: Oct. 25, 1988

[54] METHOD OF SECURING METALLIC TERMINAL TO THERMOPLASTIC DISTRIBUTOR CAP

[75] Inventors: Robert C. Buttry, Middletown; James A. Boyer, Anderson, both of Ind.

[73] Assignee: General Motors Corporation, Detroit, Mich.

[21] Appl. No.: 730,047

[22] Filed: May 3, 1985

Related U.S. Application Data

[62] Division of Ser. No. 651,151, Sep. 17, 1984, Pat. No. 4,544,812.

[51] Int. Cl.⁴ .......... B29C 65/02

[52] U.S. Cl. .......... 264/249; 264/25

[58] Field of Search .......... 264/249, 25

[56] References Cited

U.S. PATENT DOCUMENTS

| | | | |
|---|---|---|---|
| 1,225,343 | 5/1917 | McDonell | 264/249 |
| 1,306,791 | 6/1919 | Whelan | 200/19 WG |
| 1,745,077 | 1/1930 | Chryst | 200/19 DC |
| 1,782,939 | 11/1930 | Reis | 200/19 DC |
| 1,939,807 | 12/1933 | Fibish | 200/19 A |
| 1,966,440 | 4/1935 | Sherman | 57/250 |
| 2,075,725 | 3/1937 | Kahn | 264/249 |
| 2,090,645 | 8/1937 | Sherman | 200/19 |
| 2,291,652 | 8/1942 | Rose | 200/19 M |
| 2,304,036 | 12/1942 | Tegarty | 156/245 |
| 2,679,913 | 6/1954 | Scott | 264/249 |
| 3,001,035 | 9/1961 | Butts | 200/19 DC |
| 3,189,672 | 6/1965 | Lyman, Jr. | 264/249 |
| 3,338,604 | 8/1967 | Van Buren, Jr. | 403/280 |
| 3,470,604 | 10/1969 | Zemick | 264/249 |
| 3,497,952 | 3/1970 | King et al. | 264/249 |
| 3,530,921 | 9/1970 | Ernest | 264/249 |
| 3,591,736 | 7/1971 | Morgan et al. | 200/19 |
| 3,951,508 | 4/1976 | Farrer et al. | 200/19 |
| 4,114,976 | 9/1978 | Selvin et al. | 264/249 |
| 4,304,972 | 12/1981 | Fox et al. | 200/19 |
| 4,338,895 | 7/1982 | Lennis et al. | 200/19 |

*Primary Examiner*—James Lowe

*Attorney, Agent, or Firm*—C. R. Meland

[57] ABSTRACT

A method of securing terminals to a distributor cap and to the cap formed thereby. A molded thermoplastic distributor cap is provided which has bores formed in the towers of the cap. Die cast zinc terminals having ribs and recesses therebetween are partially inserted into the bores of the cap. With the terminals partially inserted into the cap they are engaged by an electrically heated head member which causes the terminals and cap material to heat up. When the cap material is heated to a flowable state the terminals are pushed into the cap and cap material is moved into the recesses to anchor the terminals in the cap. The terminals are provided with vent slots.

3 Claims, 3 Drawing Sheets

METHOD OF SECURING METALLIC TERMINAL TO THERMOPLASTIC DISTRIBUTOR CAP

This is a division of application Ser. No. 651,151 filed on Sept. 17, 1984 now U.S. Pat. No. 4,544,812 issued Oct. 1, 1985.

BACKGROUND OF THE INVENTION

1. Field of the Invention

This invention relates to a method of securing a metallic insert to a molded plastic body and more particularly to a method of securing metallic terminal electrodes to a molded ignition distributor cap and to a distributor cap made by the method of this invention.

2. Description of Related Prior Art

In order to avoid the difficulties associated with molding plastic material about metallic parts, such as the molding of a distributor cap to the terminals of the cap, it has been proposed to mold a plastic part with holes or openings and then fit the metal part to the opening. The metal part must be retained by the plastic part and various arrangements for accomplishing this are disclosed in the U.S. Pat. Nos. to Lennis et al. 4,338,895; Farrer et al. 3,951,508; Morgan et al. 3,591,736 and Tegarty 2,304,036.

In the above-referenced Lennis et al. patent a distributor cap is molded to such a configuration as to provide slots or openings in the towers of the cap and then terminal electrodes are fitted to the openings. The outer terminals of the distributor cap are fixed to the cap by legs on the terminals that are flexed to a locked position when a terminal is inserted into a cap opening. The center electrode is retained by yieldable fingers that are integral with the cap.

In the above-referenced Farrer et al. patent terminals are inserted into bores of the towers of the molded distributor cap. The terminals are retained in the cap by slipping a bored male terminal member over an end of the terminal. The exterior end of the terminal is then rolled or spun over the male terminal member.

In the above-referenced Morgan et al. patent the terminals are fitted to openings in the distributor cap immediately following the hot molding of the cap.

In the above-referenced Tegarty patent a metal insert is fixed to a molded plastic part by inserting the metal insert into an opening or bore formed in the plastic part. The metal part has ratchet-like teeth that cause the plastic material to cold flow behind the teeth as the metal part is inserted into the bore.

SUMMARY OF THE INVENTION

It is an object of this invention to provide a method of securing terminal electrodes to a distributor cap that results in simplified manufacture and good retention of the terminals in the cap. In accordance with this invention, a distributor cap is molded to the proper configuration and is molded to provide bores in the towers of the cap. Terminal electrodes are subsequently pushed into the bores of the cap and these terminals have a plurality of axially spaced lands or ribs that progressively increase in radial dimension from the end of the terminal that is inserted into a bore toward the head of a terminal. The radial dimension of these ribs and the radial dimension of a corresponding bore in the cap is such that one of the ribs may have a slight interference fit with the bore and the other ribs have a larger radial dimension. In assembling the terminals to the cap the terminals are pushed partially into the bores in the cap. With the terminals in place an electrically heated head member is moved into engagement with the terminals to heat the terminals. The heated terminals transfer heat to areas of the material of the cap that engage the terminals and when this material has been heated to a molten movable or flowable state the head member is moved thereby moving the terminals axially into the bores of the cap to their final assembled position. As the terminals move axially, cap material is moved by the ribs into the recesses between the ribs of the terminals. When the thermoplastic material of the cap has cooled to a solid state the material that was moved into the terminal recesses serves to securely lock the terminals in place and they are accordingly firmly anchored in the plastic material of the cap.

Another object of this invention is to provide a method of manufacturing a distributor cap of the type described above which does not require machining the terminals after the terminals have been heat-pressed to the bores of the cap. Thus, the holes in the towers of the cap are molded so as to have a D-shaped configuration and the terminals have portions thereof which have a corresponding D-shape. As a result of this, the terminals are all properly oriented when they are heat-pressed into the bores of the cap. In this regard, the interior surfaces of the terminals that cooperate with the contact of a distributor rotor are all properly positioned and hence need not be machined.

Still another object of this invention is to provide an improved distributor cap that is manufactured by heat-pressing the terminals of the cap into the bores of a molded distributor cap in a manner described above.

A further object of this invention is to provide a distributor cap and a method of manufacturing the cap wherein the terminal electrodes of the cap have venting slots that connect the interior and exterior of the distributor cap. The purpose of these venting slots is to relieve any pressure that might build up within a boot or nipple that surrounds the end of a distributor cap terminal when a female terminal of a cable is connected to a cap terminal.

DETAILED DESCRIPTION OF THE INVENTION

Figure 1:
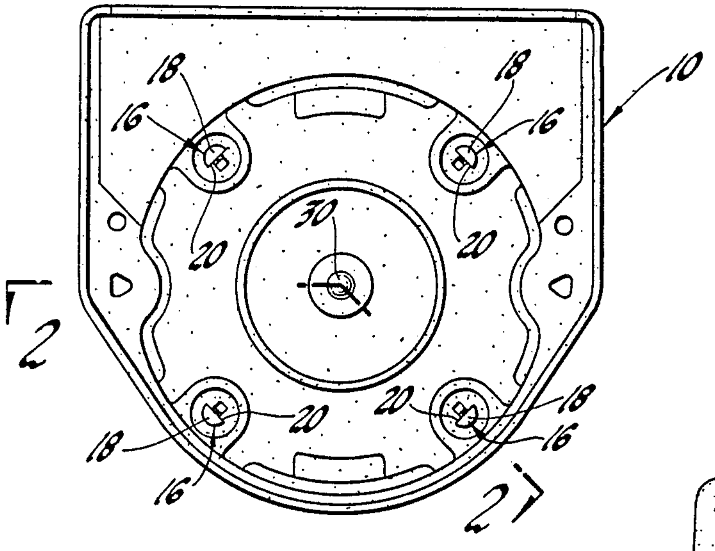
FIG. 1 is an end view of a distributor cap made in accordance with this invention illustrating the interior of the cap.
Figure 2:
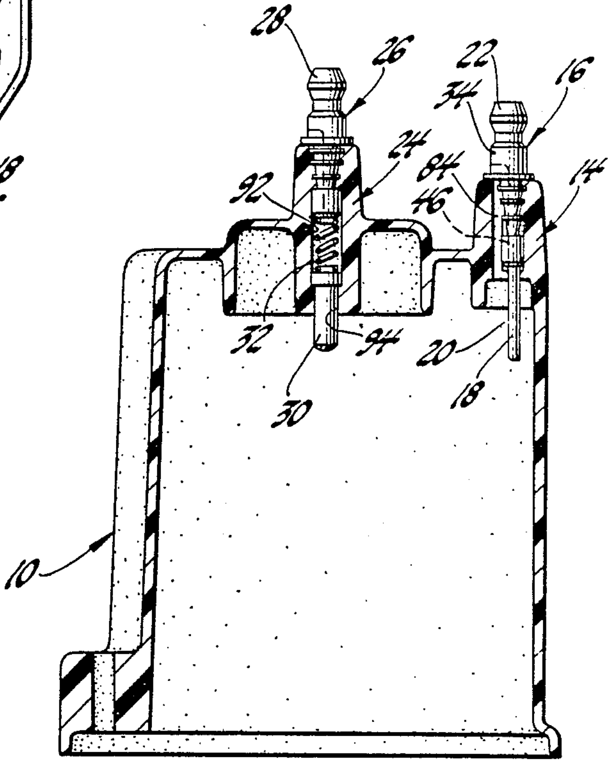
FIG. 2 is a sectional view taken along line 2—2 of FIG. 1.

Referring now to the drawings, and more particularly to FIGS. 1 and 2, the reference numeral 10 designates an ignition distributor cap which is formed of a thermoplastic material such as polypropylene or a polyester. The distributor cap 10 has four circumferentially spaced outer towers, each designated by reference numeral 14 and each tower 14 has an outer electrode or terminal generally designated by reference numeral 16 formed of die cast zinc that extends through a tower. Each terminal 16 has a portion 18 that has a flat face designated by reference numeral 20 and has a head portion 22 which is adapted to be connected to a female terminal of an ignition cable that connects a terminal 16 to a spark plug. The distributor cap 10 has a center tower designated by reference numeral 24 and disposed within the center tower is a center electrode or terminal generally designated by reference numeral 26 that is formed of die cast zinc. The terminal 26 has a head portion 28 which is adapted to be connected to an ignition cable that connects this terminal to the secondary winding of an ignition coil.

The distributor cap has a carbon brush 30 which is spring biased toward the interior of the cap by a metallic spring 32 which also serves to electrically connect the terminal 26 to the brush 30. The brush 30, as is well known to those skilled in the art, engages an insert or contact of a distributor rotor and this insert or contact has an end face which swings past the faces 20 of the outer electrodes 16, there being a predetermined gap between the face of the contact of the rotor and the surfaces 20.

Figure 6:
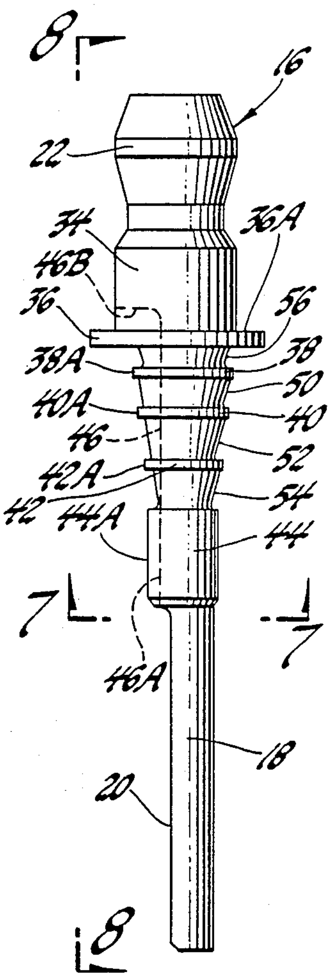
FIG. 6 is a plan view of an outer electrode or terminal for the distributor cap of this invention.
Figure 7:
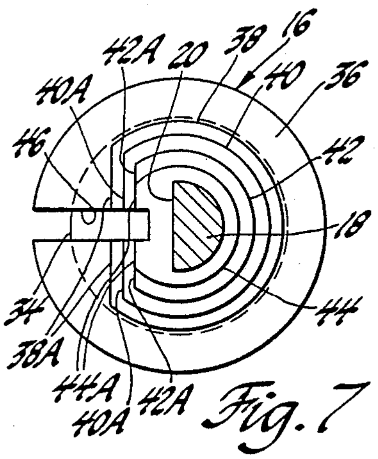
FIG. 7 is an enlarged sectional view of the terminal illustrated in FIG. 6 taken along line 7—7 of FIG. 6.
Figure 8:
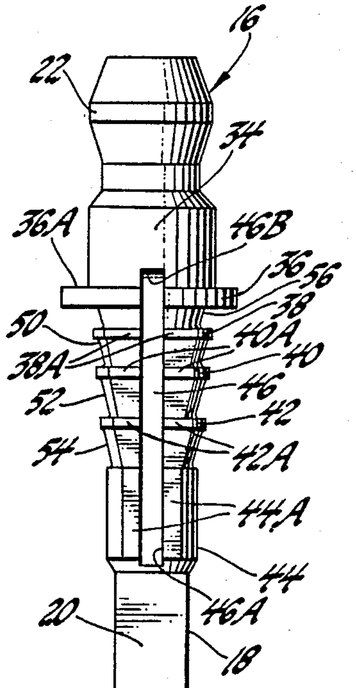
FIG. 8 is a plan view of an outer electrode for the distributor cap looking in the direction of line 8—8 of FIG. 6.

The outer terminals 16 are identical and one of them is illustrated in detail in FIGS. 6, 7 and 8. The terminal 16, in addition to having the portions 18 and 22, includes a cylindrical portion 34, an annular flange 36, three ribs or lands 38, 40 and 42 and a D-shaped portion 44. The outer surfaces of ribs 38, 40 and 42 are defined by arcs of a circle, the center of which coincides with the longitudinal axis of circular portion 34 as best depicted in FIG. 7. These arcs extend more than 180°. The ribs merge into flat ridges or ribs 38A, 40A and 42A located on an opposite side of terminal 16 which are depicted in FIGS. 7 and 8. The outer arcuate surfaces of ribs 38–42 join the respective flat ribs 38A–42A so that the resultant outer configuration of each joined pair of ribs is D-shaped. The portion 44 is also defined by an arc of a circle which terminates in flat walls 44A to provide the D-shape. The surfaces between ribs 38 and 40, between ribs 40 and 42 and between rib 42 and portion 44 are substantially conical and may be tapered at an angle of approximately 15° to the longitudinal axis of portion 34. The terminal 16 is provided with an axially extending slot 46 which extends between open ends 46A and 46B and which extends through the annular flange 36. The slot 46 is a venting slot and its purpose will be described in detail hereinafter. It can be seen, from an inspection of FIG. 6, that tapered recesses 50, 52 and 54 are defined by the configuration of the terminal. There also is a recess 56 disposed between an end of the annular flange 36 and the rib or land 38. Some of these recesses become filled with the plastic material of the distributor cap when the terminals 16 are assembled to the cap in a manner to be described.

The surfaces between ridges 38A and 40A, between ridges 40A and 42A and between ridges 42A and an end of portion 44, are flat and are slightly inclined as illustrated in FIG. 6. These surfaces and the ridges define recesses, some of which become filled by the plastic material of the cap.

The radius of the outer surfaces of ribs 42, 40 and 38 progressively increases from rib 42 to rib 38. That is, the radius of rib 38 is larger than the radius of rib 40 and the radius of rib 40 is larger than the radius of rib 42. The term radius, as used herein, means a radius measured from a line that coincides with the longitudinal axis of circular portion 34 to the outer surface of a rib.

The surfaces of flat ridges 42A, 40A and 38A also progressively increase in dimension from ridge 42A to ridge 38A. Thus, the distance between an imaginary plane that coincides with the longitudinal axis of portion 34 and ridges 42A, 40A and 38A progressively increases when going from ridge 42A to ridge 38A as depicted in FIG. 7.

Figure 9:
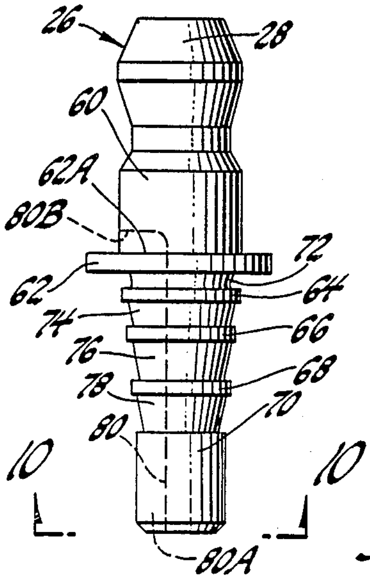
FIG. 9 is a plan view of the center electrode of the distributor cap illustrated in FIGS. 1 and 2.
Figure 10:
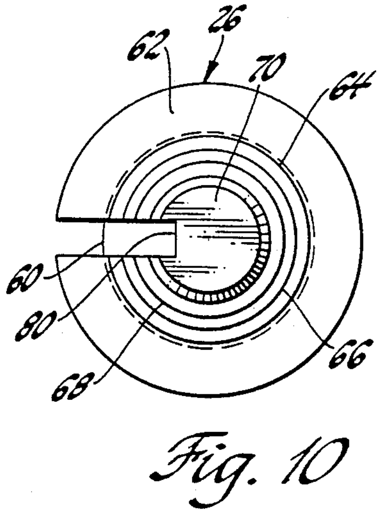
FIG. 10 is an enlarged end view of the terminal illustrated in FIG. 9 looking in the direction of arrows 10—10 of FIG. 9.

The center terminal 26 of the distributor cap 10 is illustrated in detail in FIGS. 9 and 10. This terminal has a cylindrical portion 60, an annular flange 62, circular ribs or lands 64, 66 and 68 and a cylindrical portion 70. The surfaces between ribs 64 and 66, between ribs 66 and 68 and between rib 68 and the end of portion 70 are all substantially conical and may have a taper of approximately 15° to the longitudinal axis of the terminal 26. The ribs are of progressively increasing diameter when going from rib 68 to rib 64, that is, rib 64 has a larger diameter than rib 66 and rib 66 has a larger diameter than rib 68. The configuration of terminal 26 provides a recess 72 between rib 64 and the end of flange 62. Tapered recesses 74 and 76 are located respectively between ribs 64 and 66 and between ribs 66 and 68 and another recess 78 is defined between rib 68 and the end of the cylindrical portion 70. The terminal 26 has an axially extending slot 80 which extends between open ends 80A and 80B. This slot extends through annular flange 62. The slot 80 forms a vent slot, the purpose of which will be described hereinafter.

Figure 3:
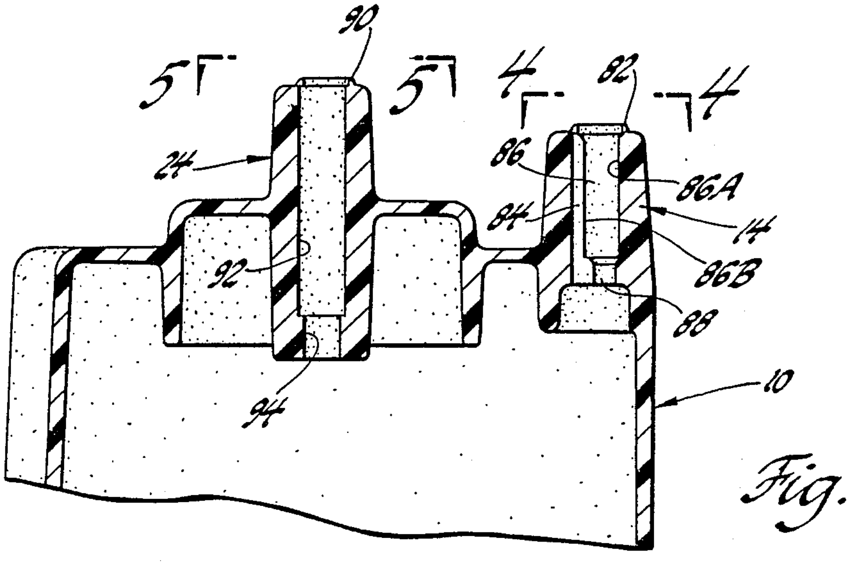
FIG. 3 is an enlarged sectional view of a portion of the distributor cap illustrated in FIG. 2 prior to assembly of the terminals to the cap.
Figure 4:
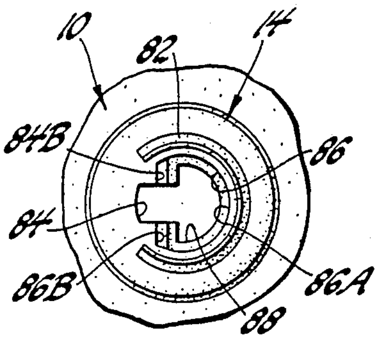
FIG. 4 is an enlarged fragmentary view looking in the direction of arrows 4—4 of FIG. 3.
Figure 5:
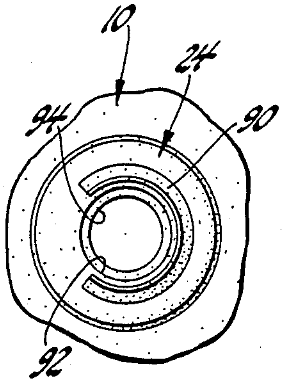
FIG. 5 is an enlarged fragmentary view looking in the direction of arrows 5—5 of FIG. 3.

The distributor cap 10 is illustrated in FIGS. 3, 4 and 5 after it has been molded and prior to assembly of the terminals to the cap. Each tower 14 of the distributor cap has a rib 82 at the end thereof which is defined by an arc of a circle that extends for approximately 270°. The tower 14 has an axially extending slot 84. This slot is aligned with the slot 46 of terminal 16 when the terminal 16 is assembled to the distributor cap 10. The slot 84 is open to a D-shaped hole 86 defined by an arcuate surface 86A and flat surfaces 86B located on opposite sides of slot 84. The hole 86 is aligned with a D-shaped hole 88 which communicates with slot 84. When the terminal 16 is initially inserted into the tower 14, in a manner to be more fully described, the D-shaped portion 18 of terminal 16 slides through the D-shaped hole 88 and terminal portion 44 slides through hole 86.

The center tower 24 of the distributor cap 10 has a circumferentially extending rib 90 which extends arcuately for approximately 270°. The tower 24 has an axially extending circular bore 92 which communicates with a smaller diameter circular bore 94.

The method of assembling the terminals or electrodes to a molded distributor cap will now be described. Briefly, the method of this invention contemplates initially inserting the outer electrodes partially into the bores of the towers 14 and partially inserting the center electrode 26 into the bore of the tower 24. With the terminals supported in the bores of the distributor cap an electrically heated head member engages the annular flanged portions of all of the terminals. The terminals are raised in temperature and areas of the material of the cap that are engaged by the terminals begins to heat up and eventually will be heated to a flowable or molten condition. When areas of the material of the cap immediately adjacent a terminal have been heated to a hot flowable state, the electrically heated head is moved toward the cap to simultaneously push all of the terminals to a final assembled position in the cap. After heat has been removed the flowable plastic material, that has been flowed into recesses of the terminals, solidifies to positively anchor the terminals to the cap.

Figure 11:
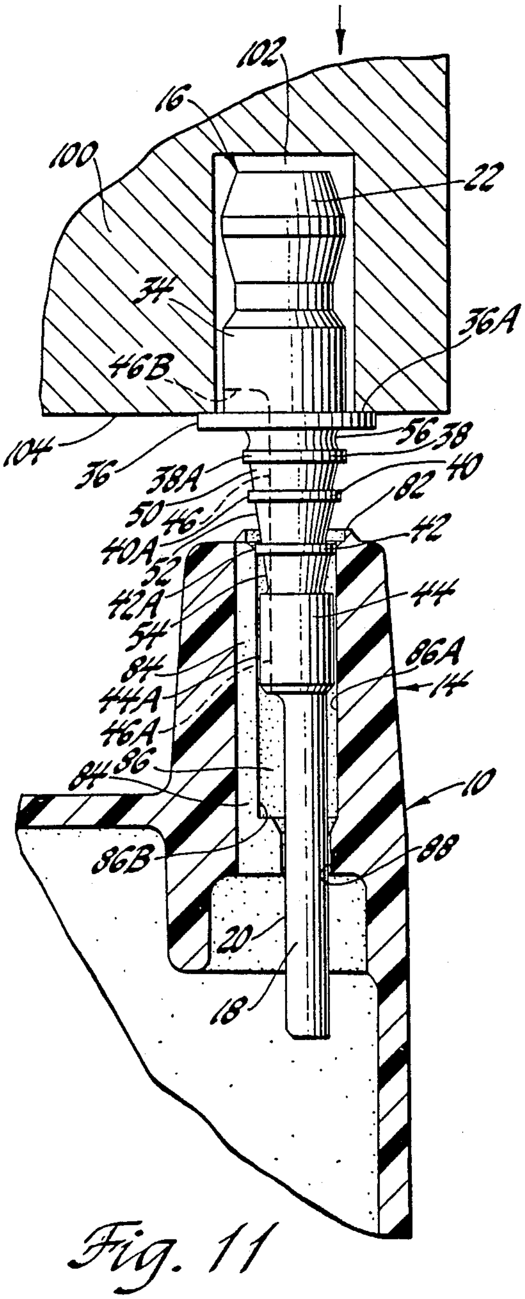
FIG. 11 is a view which illustrates the method of hot pressing a terminal into a bore of a distributor cap.
Figure 12:
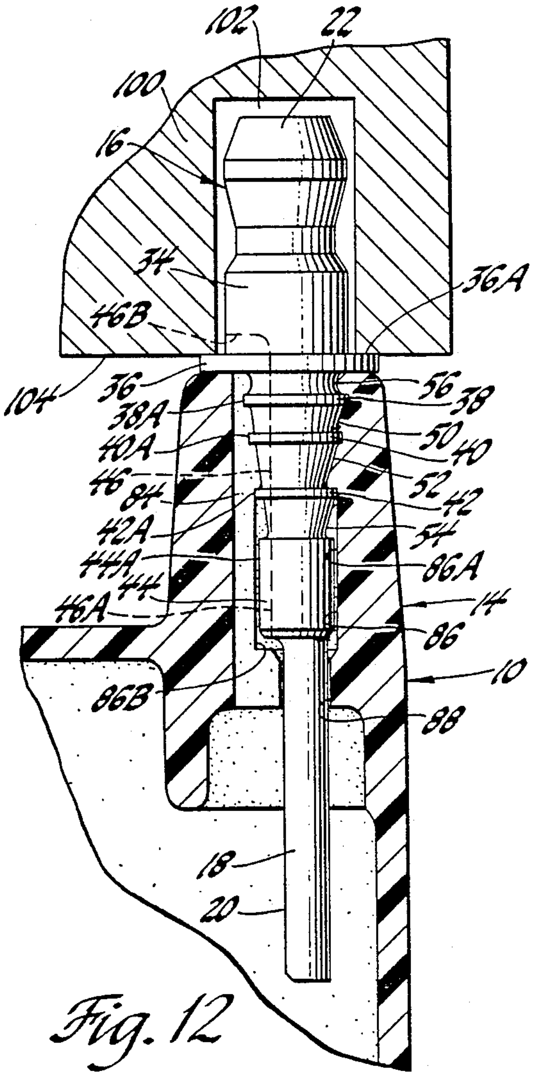
FIG. 12 is a view illustrating the final assembled position of a terminal relative to the tower of a distributor cap.
Figure 13:
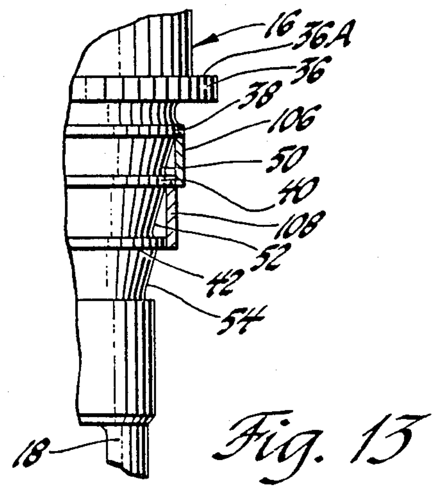
FIG. 13 illustrates an electrode or terminal for the distributor cap of this invention and illustrates relative dimensions that are useful in understanding this invention.

FIGS. 11, 12 and 13 illustrate the method that has just been described and illustrates how a terminal 16 is heat-pressed into the bore of a tower 14 of the distributor cap. In FIG. 11, the reference numeral 100 designates an electrically heated head member. The head member 100 is formed of steel and has an electric heater embedded therein which has not been illustrated. The head member 100 has four bores 102 which are sized to receive a terminal 16. The head member 100 has a flat surface 104 which can engage the flat annular surface 36A of annular flange 36. The bores 102 in the head member 100 have the proper circumferential orientation so that they can receive the upper ends of all four terminals 16. In addition, the head member 100 has a center bore (not illustrated) which can accommodate the center terminal 26.

In FIG. 11 the terminal 16 is illustrated positioned in tower 14. The terminals 16 are initially pushed into the bores of tower 14 such that ribs 42 and 42A are disposed closely adjacent one end of the tower 14.

The shape of the D-shaped hole 86 is the same as the shape of the D-shaped ribs (42–42A), (40–40A) and (38–38A) of terminal 16. The shape of D-shaped terminal portion 44 is the same as the shape of bore 86 and the shape of D-shaped terminal portion 18 is the same as the shape of D-shaped bore 88. The relative dimensions of portions 18 and 44 of terminal 16 and complementary holes or bores 88 and 86 in tower 14 are such that there is some clearance (slip fit) between these parts when a terminal is inserted in a tower. The relative dimensions of ribs (42–42A) and bore 86 is such that, due to manufacturing tolerances, these parts may have clearance of about 0.025 mm or an interference fit of about 0.075 mm. By interference fit it is meant that the outer dimension of the ribs (42–42A) are larger than the bore 86. The relative dimensions of ribs (40–40A) and bore 86 is such as to provide interference of about 0.025 mm to 0.125 mm and the relative dimensions of ribs (38–38A) and bore 86 is such as to provide interference of about 0.075 mm to 0.175 mm. From the foregoing it will be appreciated that when the terminal 16 is initially partially inserted into the tower 14, to the depth illustrated in FIG. 11, the terminal 16 will be firmly held by the tower 14 by the engagement of the outer surfaces of ribs (42–42A) with the internal wall of hole 86. Further, and due to the complementary D-shapes of the terminal parts and the bores of tower 14, the terminal 16 will be in proper rotary orientation and cannot rotate relative to the cap.

The manner in which one terminal 16 is heat pressed into a tower 14 will now be described, it being understood that the head member 100 will simultaneously heat-press the four terminals 16 and the center terminal 26 into the bores of the cap. With the terminal 16 positioned, as shown in FIG. 11, and the cap fixed from movement, the electric heated head member 100 is moved downwardly so that surface 104 engages surface 36A of flange 36, as depicted in FIG. 11. The head 100 may be heated to a temperature of approximately 900° F. and as a result the terminal 16 is heated by heat transfer from the head 100 to the flange 36. The heat is transferred from the terminal 16 to the cap material via ribs (42–42A). Thus, the portions of the ribs (42–42A) of terminal 16, that are in engagement with the internal surface of bore 86, heat the material of the cap immediately adjacent the terminal. Assuming the cap to be formed of polypropylene, when the temperature of the cap material reaches approximately 330° F., which is the melting point of polypropylene, the heated head member 100 is moved slowly downwardly, in FIG. 11, to force the terminal 16 from the position shown in FIG. 11 to the position shown in FIG. 12. The time that it takes to move terminal 16 from the FIG. 11 position to the FIG. 12 position may be about 7 to 10 seconds. As the terminal 16 moves down, ribs (42–42A) continue to heat the internal wall of the bore of the tower 14 and eventually ribs (40–40A) contact and then heat the bore wall of tower 14 and these ribs then begin to force or move cap material into the recesses below the ribs. As the terminal 16 continues to move down, ribs (42–42A) and (40–40A) continue to heat the bore wall and eventually ribs (38–38A) enter the bore of tower 14 and they heat the bore wall. Ribs (38–38A) force cap material into the recesses below these ribs. As the terminal is moved to its fully inserted position, illustrated in FIG. 12, the flange 36 causes the material of rib 82 to be displaced into recess 56. The recess 56 is only partially circumferentially filled by the material of the annular rib 82 which is forced into recess 56 by the lower face of flange 36. As previously mentioned, the rib 82 extends circumferentially for approximately 270° and, as depicted in FIG. 4, there is no rib material at either side of the slot 84. Since the slot 46 in terminal 16 is aligned with slot 84 there also is no rib material at either side of slot 46. Thus, the material of the rib 82 that is moved or displaced into recess 56 does not block off or fill the slots 84 and 46 as the terminal 16 is heat-pressed into the cap because there is not enough rib material to entirely circumferentially fill the recess 56. As the terminal 16 is moved down, little or no cap material is moved into recess 54 because ribs (42–42A) are about the same size as bore 86.

As the heated terminal 16 is moved from the FIG. 11 position to the FIG. 12 position the portion 44 of the terminal slides with a slip fit in D-shaped hole 86 and terminal portion 18 slides with a slip fit in D-shaped hole 88. The bore walls of these holes are heated to some extent but remain sufficiently rigid so as to oppose any substantial rotation or tilting of terminal 16 as it is moved to its final inserted position.

In regard to the filling of recesses 50 and 52 with cap material, reference should now be had to FIG. 13 which is an aid in illustrating how this movement or displacement of cap material occurs. In FIG. 13 the terminal 16 is partially illustrated, as are the ribs 38, 40 and 42. In FIG. 13, two rectangular cross-sectioned areas are illustrated which are designated respectively by reference numerals 106 and 108. The rectangular area 106 is intended to depict a semi-circular band of cap material which is forced into the recess 50 by rib 38 as the terminal 16 is inserted into the cap. The circumferential extent of this band of material corresponds to the circumferential extent of rib 38. The volume of this annular band of material substantially equals the volume of the recess 50 where the volume of recess 50 is defined as extending around terminal 16 to the same extent as the circumferential extent of rib 38 (more than 180°) and further defined by the conical inner surface between ribs 38 and 40. The same is true in regard to the rectangular band of material designated by reference numeral 108 and the recess 52. In this case, rib 40 forces cap material into recess 52. As previously mentioned, during the insertion of terminal 16 into the cap, the recess 54 does not substantially receive any cap material since the dimension of ribs (42–42A) is approximately the same as the dimension of the bore 86.

When the terminal 16 is being inserted into the cap the slot 84 in the cap is aligned with the slot 46 formed in the terminal. The slot 46 is not as wide as slot 84, for example slot 46 may be about 1 mm wide and slot 84 about 2 mm wide. It is important that slot 46 not be filled with plastic material so as to block it since slot 46 must vent the interior of the cap to open end 46B that is located just adjacent the outer end 36A of annular flange 36. As the terminal 16 is heat-pressed into the cap the flat ribs 38A and 40A will cause a flow of cap material from the flat surfaces 86B located on opposite sides of cap slot 84 into recessed areas immediately below these ribs to fill these areas. There will be substantially no cap material moved by rib 42A since it, with rib 42, have about the same dimension as bore 86. The dimensions of the parts, including slots 84 and 46, are such that the flow of material caused by ribs 38A and 40A does not result in any substantial flow of material into terminal slot 46. There will be some flow of cap material (not illustrated) into cap slot 84 and there may be some material hot flowed into the outer extremity of slot 46. The net result of this is that upon completion of the insertion of terminal 16 into the cap there will always be an open channel between ends 46A and 46B connecting the interior of the cap to open end 46B. This open channel is defined by slot 46 and the cap material covering of the open side of slot 46.

The purpose of slot 46, as previously mentioned, is to provide a vent. Thus, when an ignition cable that has a rubber nipple or boot embracing a female terminal is connected to the head portion of terminal 16 with the boot engaging the outer surface of tower 14 it is possible for air to be trapped within the boot and if this air were not vented it may expand, due to heating, to cause the terminal of the ignition cable to be pushed off the terminal 16. The slot 46 of the distributor cap vents the interior of the boot to the interior of the distributor cap and hence prevents such blowoff.

The center terminal 26 is heat-pressed into the center cap bore 92 in the same manner that has been described in connection with the insertion of terminal 16. The diameter of the portion 70 and the diameter of rib 68 are such that the center terminal can be initially inserted into bore 92 and it is inserted to such a depth that rib 68 is positioned closely adjacent the end of tower 24 and just below the rib 90. The diameter of rib 68 is about the same as the diameter of hole 92 so that the outer surface of rib 68 engages the inner wall of hole 92 when terminal 26 is initially partially inserted into bore 92 of tower 24. The diameters of ribs 64 and 66 provide about the same interference fit with the diameter of the bore 92 as did the ribs (38–38A) and (40–40A) of terminal 16 with cap bore 86. As the center terminal 26 is heat-pressed into its final position the material of rib 90 is moved by flange 62 into the recess 72 and the ribs 64 and 66 move cap material into the recesses immediately below these ribs. Little or no material is moved into the recess immediately below rib 68 since it has about the same diameter as bore 92.

As previously pointed out, the terminal 26 has an axially extending vent slot 80 that performs the same function as the vent slot 46 in terminal 16. Since the ribs 64, 66 and 68 and the recesses therebetween are all substantially conical the slot 80 does not become completely filled with cap material when terminal 26 is heat-pressed into circular bore 92. Some cap material will flow into the outer extremity of slot 80 but it does not plug it. Since the slot 80 does not become completely filled with cap material when it is inserted into the cap it need not have any particular rotary orientation when inserted into the cap and no slot, like slot 84 in tower 14, is required.

The rib 90 can extend for 360° rather than 270° as illustrated in FIG. 5 since when it is moved into recess 72 of terminal 16 it does plug vent slot 80. A rib that extends for 270° would be useful where the parts were sized and shaped such that there might be some danger of completely filling slot 80 with cap rib material when the terminal 26 was inserted into the cap. In such a hypothetical case, the terminal 26 would have to be rotatably oriented so that slot 80 was aligned with the open end of the 270° rib when heat-pressed into the cap.

In regard to the electrically heated head member 100, it is noted that an annular surface of this member (not illustrated) must engage the surface 62A of flange 62 of the terminal 26 when it is heat-pressed into the bore 92. Since, in the final assembled condition of terminals 16 and 26 to the cap, the point of contact of the lower face of flange 62 with the end of tower 24 is axially spaced from the points of contact of the lower faces of annular flanges 36 of terminals 16 with the end of towers 14, it can be appreciated that the pushing and heating surface of head member 100 for terminal 26 must be slightly axially spaced from surface 104. The electric heated head member 100 can be operated in any conventional fashion, such as by an air cylinder, and it must engage stopping apparatus (not illustrated) so that termination of the downward movement of the head member 100 occurs at the exact point where the flanges of the terminals flow the material of the ribs 82 and 90 into their respective recesses in the terminals. When the head member 100 has been moved downward to a fully stopped position and the terminals all inserted it is moved out of contact with the terminals so that heating of the terminals ceases. The cap material now cools and solidifies to firmly anchor the terminals in place.

The process steps for assembling the terminals to the cap are summarized as follows:

(1) A molded cap and die cast zinc terminals are provided.

(2) The terminals are all partially inserted into the bores of the cap with the outer terminals being inserted to the depth illustrated in FIG. 11 and the center terminal to an equivalent depth.

(3) With the terminals all partially inserted in the cap the electrically heated head member 100 is brought into contact with the flanges of all of the terminals and the terminals and cap material begin to heat up.

(4) When areas of the cap material have been heated to a melting temperature the terminals are simultaneously pressed into the cap to the proper depth and cap material is forced by the terminal ribs into the recesses between the ribs.

(5) The head member is disengaged from the terminals and the material of the cap cools and solidifies to firmly anchor the terminals to the cap.

The terminals of a distributor cap, made in accordance with this invention, have good retention against pull-out or rotation relative to the cap. The terminals are retained from axial pull-out because some of the recesses or grooves between the ribs of the terminals become filled with cap material. Rotation of the outer terminals 16 of the cap is prevented because the cap material engages the outer surfaces of the D-shaped ribs and some cap material may be forced into the outer extremity of terminal slot 46. Rotation of center terminal 26 is prevented by cap material that is moved into the outer extremity of terminal slot 80.

The embodiments of the invention in which an exclusive property or privilege is claimed are defined as follows:

1. The method of securing a metallic terminal to a distributor cap, the steps comprising, providing a metallic terminal that has at least a portion of its outer periphery formed with a plurality of radially extending axially spaced ribs, the amount of radial extension of said ribs increasing progressively from one rib to another rib in one axial direction from the end of the terminal located in the cap toward the portion of the terminal located externally of the cap, the spaces between said ribs defined by inwardly tapering surfaces defining tapered recesses, the terminal having an axially extending vent slot intersecting said ribs for connecting the interior and exterior of said cap, providing a molded distributor cap that is formed of thermoplastic material that has an opening extending through a tower thereof that is of such a size and shape that at least some of said ribs of said terminal have an interference fit with the internal wall of said opening when said terminal is inserted into said opening, said opening communicating with an axially extending slot formed in said cap member, partially inserting said terminal into said opening in said distributor cap such that the terminal is supported by said cap and such that the slot in the terminal is aligned with the slot in the cap, heating said terminal to a temperature sufficient to cause the material of said cap that is engaging said terminal to assume a movable state and forcing said terminal into said opening whereby said material of said cap is moved into said recesses by said ribs, the ribs, recesses and slots being so proportioned that movement of cap material adjacent the slot in the cap does not result in plugging the slot formed in said terminal, and then permitting said cap to cool whereby said terminal is anchored in said cap by material moved into said recesses.

2. The method of assembling a metallic terminal to a distributor cap comprising, providing a metallic terminal that has a plurality of radially extending ribs defining recesses therebetween, the terminal having an annular flange and an annular groove defined by said flange and one of said ribs, an axially extending vent slot intersecting said ribs and flange for connecting the interior and exterior of the cap, providing a molded distributor cap that is formed of thermoplastic material that has an opening extending through a tower thereof and which has an annular semi-circular rib disposed adjacent one end of said tower and partially about one end of said opening, an axially extending slot in said tower which is open to said opening, partially inserting said terminal into said opening with the slots in the cap and terminal being aligned with each other, the slots being positioned such that an arcuate end of said tower that does not have a cap rib is aligned with slots, heating said terminal to a temperature sufficient to cause cap material that engages the terminal to assume a movable state and forcing said terminal into said opening, the terminal and cap being so constructed and arranged that as the heated terminal is forced into said opening said recesses are filled with cap material by said ribs and said groove is at least partially filled with cap material of said cap rib by said flange, said terminal slot remaining open to connect the interior and exterior of the cap during the movement of said terminal into said opening.

3. The method of securing a metallic terminal to a distributor cap, the steps comprising, providing a metallic terminal that has at least a portion of its outer periphery formed with a plurality of radially extending axially spaced ribs, the amount of radial extension of said ribs increasing progressively from one rib to another rib in one axial direction from the end of the terminal located in the cap toward the portion of the terminal located externally of the cap, the spaces between said ribs defined by inwardly tapering surfaces defining tapered recesses, the terminal having an annular flange located between said ribs and the portion of the terminal located externally of the cap, the flange and one of said ribs defining an annular groove, the terminal having an axially extending vent slot intersecting said ribs and flange for connecting the interior and exterior of said cap, providing a molded distributor cap that is formed of thermoplastic material that has an opening extending through a tower thereof that is of such a size and shape that at least some of said ribs of said terminal have an interference fit with the internal wall of said opening when said terminal is inserted into said opening, said opening communicating with an axially extending slot formed in said cap member, the end of said tower having a semi-circular rib, partially inserting said terminal into said opening in said distributor cap such that the terminal is supported by said cap and such that the slot in the terminal is aligned with the slot in the cap, and such that the slots are aligned with an arcuate portion of the end of said tower that does not have a cap rib, heating said terminal to a temperature sufficient to cause the material of said cap that is engaging said terminal to assume a movable state and forcing said terminal into said opening whereby said material of said cap is moved into said recesses by said ribs, and the material of said cap rib is moved into a part of said groove by said flange, the terminal ribs, cap rib, recesses, slots and groove being so proportioned that movement of cap material adjacent the slot in the cap does not result in plugging the slot formed in said terminal, and then permitting said cap to cool whereby said terminal is anchored in said cap by material moved into said recesses.

* * * * *